(12) United States Patent
Kim et al.

(10) Patent No.: US 8,199,817 B2
(45) Date of Patent: Jun. 12, 2012

(54) METHOD FOR ERROR CONCEALMENT IN DECODING OF MOVING PICTURE AND DECODING APPARATUS USING THE SAME

(75) Inventors: Yong-Deok Kim, Seoul (KR); Young-O Park, Seongnam-si (KR); Kwang-Pyo Choi, Anyang-si (KR); Jeong-Seok Choi, Yongin-si (KR); Young-Hun Joo, Yongin-si (KR); Kwan-Woong Song, Seoul (KR); Chang-Su Kim, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 1302 days.

(21) Appl. No.: 11/901,589

(22) Filed: Sep. 18, 2007

(65) Prior Publication Data

US 2008/0080623 A1    Apr. 3, 2008

(30) Foreign Application Priority Data

Sep. 29, 2006    (KR) ................... 10-2006-0095747

(51) Int. Cl.
*H04N 11/02* (2006.01)
*H04N 7/12* (2006.01)
(52) U.S. Cl. .................. 375/240.12; 375/240.24
(58) Field of Classification Search .............. None
See application file for complete search history.

(56) References Cited

U.S. PATENT DOCUMENTS

| 5,715,008 | A  | * | 2/1998 | Sekiguchi et al. ....... 375/240.15 |
| 6,141,448 | A  | * | 10/2000 | Khansari et al. .............. 382/236 |
| 6,512,795 | B1 | * | 1/2003 | Zhang et al. ............. 375/240.27 |
| 6,590,934 | B1 | * | 7/2003 | Kim ................................. 375/240 |
| 2003/0108103 | A1 | * | 6/2003 | Natsume .................. 375/240.23 |
| 2004/0114817 | A1 | * | 6/2004 | Jayant et al. .................. 382/239 |
| 2005/0138532 | A1 | * | 6/2005 | Park ............................. 714/776 |
| 2006/0062304 | A1 | * | 3/2006 | Hsia ........................ 375/240.16 |

FOREIGN PATENT DOCUMENTS

| KR | 2001-1208 | 1/2001 |
| KR | 2003-32231 | 4/2003 |
| KR | 2004-80499 | 9/2004 |
| KR | 2004-100359 | 12/2004 |

* cited by examiner

*Primary Examiner* — Clemence Han
(74) *Attorney, Agent, or Firm* — Cha & Reiter, LLC

(57) ABSTRACT

A method and apparatus for error concealment in decoding of a moving picture. The method includes the steps of determining an erroneous macro block in a present frame when the moving picture is decoded, finding a first macro block having a highest similarity to the erroneous macro block and a second macro block having a next highest similarity to the erroneous block in a previous frame by comparing adjacent pixels of respective blocks in the previous frame with adjacent pixels of the erroneous block in the present frame; and replacing the erroneous block by using an average between the found macro blocks having the highest similarity and the second highest similarity to thereby conceal the erroneous macro block. The apparatus includes a parser, an entropy decoder, an inverse quantizer, an inverse converter, and a concealment unit that uses motion compensation from a previous frame to correct a macro block in a current frame.

15 Claims, 4 Drawing Sheets

METHOD FOR ERROR CONCEALMENT IN DECODING OF MOVING PICTURE AND DECODING APPARATUS USING THE SAME

CLAIM OF PRIORITY

This application claims the benefit under 35 U.S.C. §119 (a) of priority from an application entitled "Method for Error Concealment in Decoding of Moving Picture and Decoding Apparatus Using the Same," filed in the Korean Industrial Property Office on Sep. 29, 2006 and assigned Serial No. 2006-095747, the contents of which are hereby incorporated by reference in its entirety.

BACKGROUND OF THE INVENTION

1. Field of the Invention

The present invention relates to a technology for decoding a moving picture. More particularly, the present invention relates to a method for error concealment in the decoding of a moving picture, and a decoding apparatus that conceals errors in accordance with the method.

2. Description of the Related Art

Moving pictures are transmitted over a number of different systems whereby it is desirable to use a coded transmission that often includes compression of the images. Most moving picture coding standards, which include H.263, H.264 and MPEG-4, employ relatively efficient image compression techniques such as variable length coding (VLC), spatial and motion prediction, etc., in order to reduce the bandwidth necessary to transmit and receive moving pictures, and reduce the transmission time as well.

However, variable length coding has problems in that it is very vulnerable to an erroneous channel environment. For example, even a few bit errors may cause a loss of synchronism during image decoding. Furthermore, variable length coding utilizes a prediction coding technique that can lead to error propagation throughout the whole image. Accordingly, the use of variable length coding can often lead to the quality of a restored image being significantly poorer than the original due to the susceptibility to errors occurring during channel transmission, as well as storage medium recording and/or reading.

In order to effectively address the aforementioned transmission errors, which are inevitable with present transmission technology, research has been conducted on coding techniques robust to errors and error concealment (EC) techniques that minimize damage due to errors occurring in a transmission environment.

There are a variety of other EC techniques available, including a post-processing technique, which is in widespread use. The post-processing technique assigns responsibility for EC to the decoder. The post-processing technique is an EC technique that can be somewhat effective for recovering erroneous information by using such a characteristic that, in the case of a natural image, provides for spatially or temporally adjacent pixels to change smoothly. According to the post-processing technique, an erroneous block is recovered in units of pixels or macro blocks by using a pixel value or motion vector (MV) of a block neighboring the erroneous block.

Accordingly, the post-processing EC technique is largely classified as a temporal EC (TEC) scheme and a spatial EC (SEC) scheme. In the TEC scheme, through the use of a high similarity between temporally successive images, a block most similar to an erroneous block in a present image is found in a reference image to the present image, and the erroneous block is concealed by the block most similar found in the reference image. In the SEC scheme, assuming that pixels neighboring in a spatial domain show no abrupt change in brightness, an erroneous portion is concealed by using pixel values of normally decoded blocks around the damage portion.

In general, the SEC scheme is favored for the error concealment of a still image or an image coded in an intra mode, and the TEC scheme is favored for the error concealment of an inter frame. Most moving pictures are coded using an inter frame in order to achieve high coding efficiency, and thus the TEC scheme exhibits higher recovery efficiency. The most popular TEC technique is a decoder motion vector estimation (DMVE) technique for finding a motion vector so as to recover an erroneous block in a decoder.

The DMVE technique is a technique on the decoder side that is similar to a motion estimation process in an encoder, which is a process of finding a block exhibiting a characteristic similar to that of a specific block by comparing the specific block with a reference frame. The DMVE technique also utilizes error concealment wherein a macro block having the highest similarity to a block requiring error concealment is found in a reference fame, and the corresponding macro block is recovered using the found similar block.

FIG. 1 illustrates the concept of a DMVE technique for error concealment in decoding of a moving picture that is sometimes used. Referring to FIG. 1, in order to conceal an erroneous macro block 102 in a present frame, a search window 110, which is appropriately set larger than the corresponding erroneous block while containing the same, is established in a previous frame, and respective blocks are searched in the corresponding search window 110. Error concealment is conducted by finding a macro block 112 having adjacent pixels (for example, pixels within appropriate upper, lower and left ranges) with the smallest differences from those of the erroneous macro block 102, and then the erroneous macro block 102 in the present frame is thereby replaced by the found macro block 112. The reason that the macro blocks appear to have only three dark sides is due to the characteristic of the H.264 codec, wherein it is not feasible to use information about pixels on the right side of a macro block because these pixels are always erroneous. In some cases it is also impossible to use information about pixels positioned on the lower side of a macro block. Further, respective pixel values are compared by using a scheme in which a Sum of Absolute Differences (SAD) is ascertained. An example of the aforementioned DMVE technique is disclosed in a paper "A cell-loss concealment technique for MPEG-2 codec video", IEEE Transaction on Circuits and Systems for Video Technology (published in June, 2000), which is hereby incorporated by reference in its entirety as background material.

Although the exemplary DMVE technique described above provides comparatively high recovery efficiency, a more accurate error concealment technique is needed. The need in the art is apparent as soon as the corrected image is compared with an original image. In view of the quality issues with DMVE, the DMVE technique requires a large amount of calculations in order to be effective. In addition, DMVE, as well as the other EC techniques discussed above, has a problem in that it is not easy to apply to a multi-hypothesis technique in which high recovery efficiency can be achieved by a combination of two or more error concealment techniques.

The multi-hypothesis technique is a technique for conducting error concealment having higher stability, whereby two or more previous reference blocks are combined so as to recover an erroneous block, and can provide comparatively accurate error concealment because of the utilization of two or more independent methods. However, the multi-hypothesis technique has a problem in that the amount of calculations increases even more than the use of most of the single techniques. An example of such a multi-hypothesis technique is disclosed in a paper "Multi-hypothesis error concealment algorithm for H.26L video", Journal of ICIP2003 (published in September, 2003).

SUMMARY OF THE INVENTION

Accordingly, the present invention has been made in part to solve some of the above-mentioned problems occurring in the prior art. In addition, the present invention provides a method for efficient error concealment in the decoding of a moving picture, which makes it possible to obtain a higher recovery efficiency than known before with a reduction in the quantity of calculations, and a decoding apparatus using the same.

In accordance with an aspect of the present invention, a method for error concealment in the decoding of a moving picture may include the steps of: ascertaining an erroneous block in a present frame when the moving picture is decoded; finding a first block having a highest similarity to the erroneous block and a second block having at least a second highest similarity to the erroneous block in a previous frame by comparing adjacent pixels of respective blocks in the previous frame with adjacent pixels of the erroneous block in the present frame; and replacing the erroneous block by using an average value between the first and second found blocks having the highest similarity and the second highest similarity, to thereby conceal the erroneous block.

In accordance with another aspect of the present invention, a moving picture decoding apparatus for conducting an error concealment function includes: a parser for parsing an input bit stream in units of slices; an entropy decoder for receiving an output from the parser and entropy-decoding the output in units of macro blocks, and an error concealment unit having information on an erroneous macro block; an inverse quantizer unit for receiving an output from the entropy decoder and inversely quantizing a discrete cosine transform (DCT) coefficient that has been quantized during coding to recover the DCT coefficient; an inverse converter unit for receiving output data from the inverse quantizer unit and converting data, having been discrete cosine transformed during the coding into original data; a motion compensator unit for outputting motion compensation information by making a comparison to an image of a previous reference frame; an adder unit for adding an output from the inverse converter unit to an output from the motion compensator unit; and an error concealment unit for concealing the erroneous macro block in an output from the adder unit by using the previous reference frame, and outputting a final recovered frame, wherein the error concealment unit finds a first block having a highest similarity to the erroneous macro block and a second block having a second highest similarity to the erroneous macro block and replaces the erroneous macro block by using an average between the first and second found blocks to concealing the erroneous macro block.

BRIEF DESCRIPTION OF THE DRAWINGS

The above-mentioned examples, as well as other aspects, features and advantages of the present invention will be more apparent from the following detailed description taken in conjunction with the accompanying drawings, in which.

DETAILED DESCRIPTION OF THE PRESENT INVENTION

Figure 1:
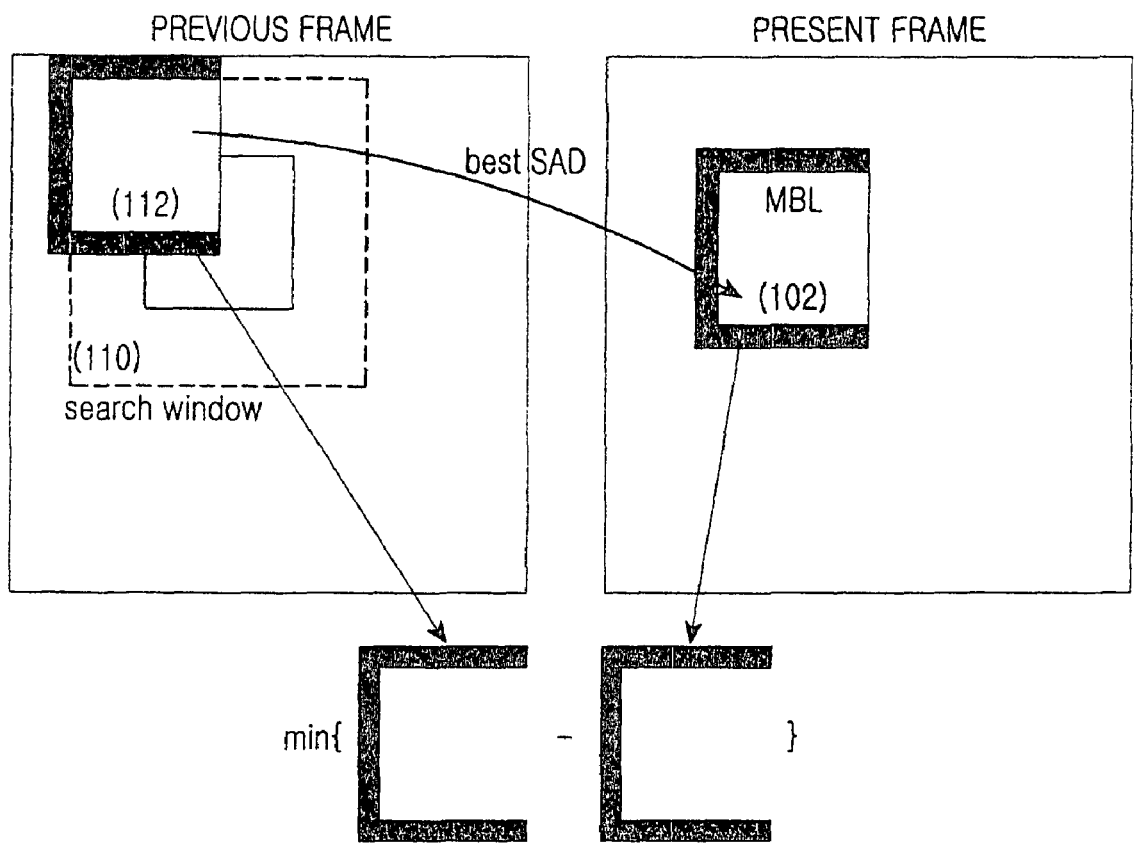
FIG. 1 is a conceptual overview of a conventional DMVE technique for error concealment in decoding a moving picture.

Hereinafter, some exemplary embodiments of the present invention will be described with reference to the accompanying drawings. The examples are provided for purposes of illustration and not for limitation. In the following detailed description, the same elements will be designated by the same reference numerals although they are shown in different drawings. Further, in the following description, only parts necessary for understanding operations of the present invention will described, and a detailed description of known functions and configurations incorporated herein will be omitted so as not to obscure the subject matter of the present invention with unnecessary detail.

Figure 2:
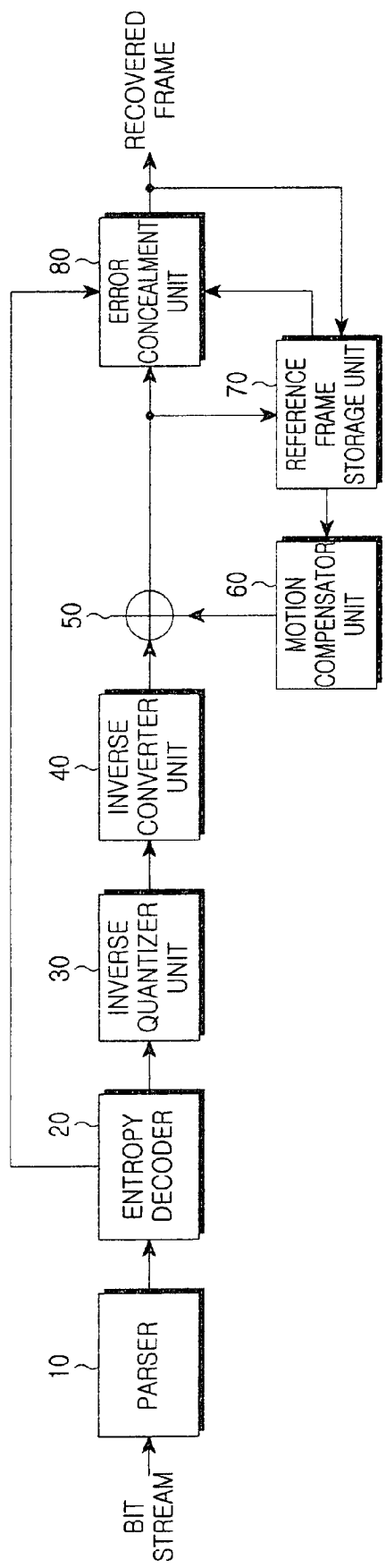
FIG. 2 is a block diagram illustrating the structure of a decoding apparatus according to the present invention.

FIG. 2 is a block diagram illustrating the structure of an image decoding apparatus according to an exemplary embodiment of the present invention. The construction and operation of the image decoding apparatus according to the present invention will be first described with reference to the example shown in FIG. 2.

In a brief overview, the image decoding apparatus is typically constructed to perform a decoding procedure in the reverse order of a coding procedure in an image coding apparatus (not shown). The image is typical entropy encoded for data compression purposes, meaning that symbols are assigned codes to match code lengths with the probabilities of the symbols. Data compression is typically performed in the image coding apparatus (not shown) by replacing symbols represented by equal-length codes with symbols represented by codes wherein the codeword length is proportional to a negative logarithm of the probability. A bit stream of a video coding layer (VCL) NAL (Network Abstraction Layer), transmitted from the image coding apparatus is input into the image decoding apparatus shown in FIG. 2.

Still referring to FIG. 2, in the VCL NAL, one frame is divided into a plurality of slices, one slice comprises a slice header and a data field, and each slice data may comprise of at least one macro block, and in particular, a plurality of macro blocks. A parser 10 parses an input stream a parsed bit stream comprising in units of slices, and then outputs the parsed bit stream to an entropy decoder 20. The entropy decoder 20 entropy-decodes the parsed bit stream again in units of macro blocks, and outputs an entropy-decoded bitstream to an inverse quantizer unit 30. At the same time, the entropy decoder 20 provides an error concealment unit 80 with information on an erroneous macro block (or slice).

The inverse quantizer unit 30 shown in FIG. 2 inversely quantizes a discrete cosine transform (DCT) coefficient, which has been quantized during coding, to thereby recovering the DCT coefficient. Data output from the inverse quantizer unit 30 is then input to an inverse converter unit 40. The inverse converter unit 40 converts data that has been discrete cosine transformed during the coding into original data.

A reference frame storage unit 70 stores an image of a previous frame (reference frame). A motion compensator unit 60 outputs motion compensation information by making reference to the image of the previous frame stored in the reference frame storage unit 70. An adder unit 50 adds an output from the inverse converter unit 40 with an output from the motion compensator unit 60, and outputs decoded image data to error concealment unit 80.

Still referring to the image decoding apparatus in FIG. 2, the error concealment unit 80 conceals the erroneous macro block in an output from the adder unit 50 by using the previous reference frame stored in the reference frame storage unit 70, and outputs a final recovered frame.

For the accurate recovery of errors, the existing DMVE technique, which was illustrated in FIG. 1, performs a process of finding a block most suitable for matching with an erroneous block in a certain region of a previous frame. This process requires a large amount of calculations because all blocks existing in the certain region of the previous frame are compared one-by-one with the erroneous block. If another error concealment technique is also applied to such a process according to the multi-hypothesis concept in order to achieve a more accurate recovery of errors, the amount of calculations increases even further. Therefore, the present invention obtains a block (which is referred to as a first block) that is most suitable for matching with an erroneous block as in the DMVE technique. However, rather than pass through a calculation procedure for applying a separate another error concealment technique when applying the multi-hypothesis concept, the present invention finds a second block that is the second most suitable block among the existing calculated results used for the finding of the first block, and then evaluates an average between the first block and the second block most suitable for concealing the erroneous macro block, thereby enabling error concealment having a higher stability than that of the conventional DMVE technique.

Figure 3:
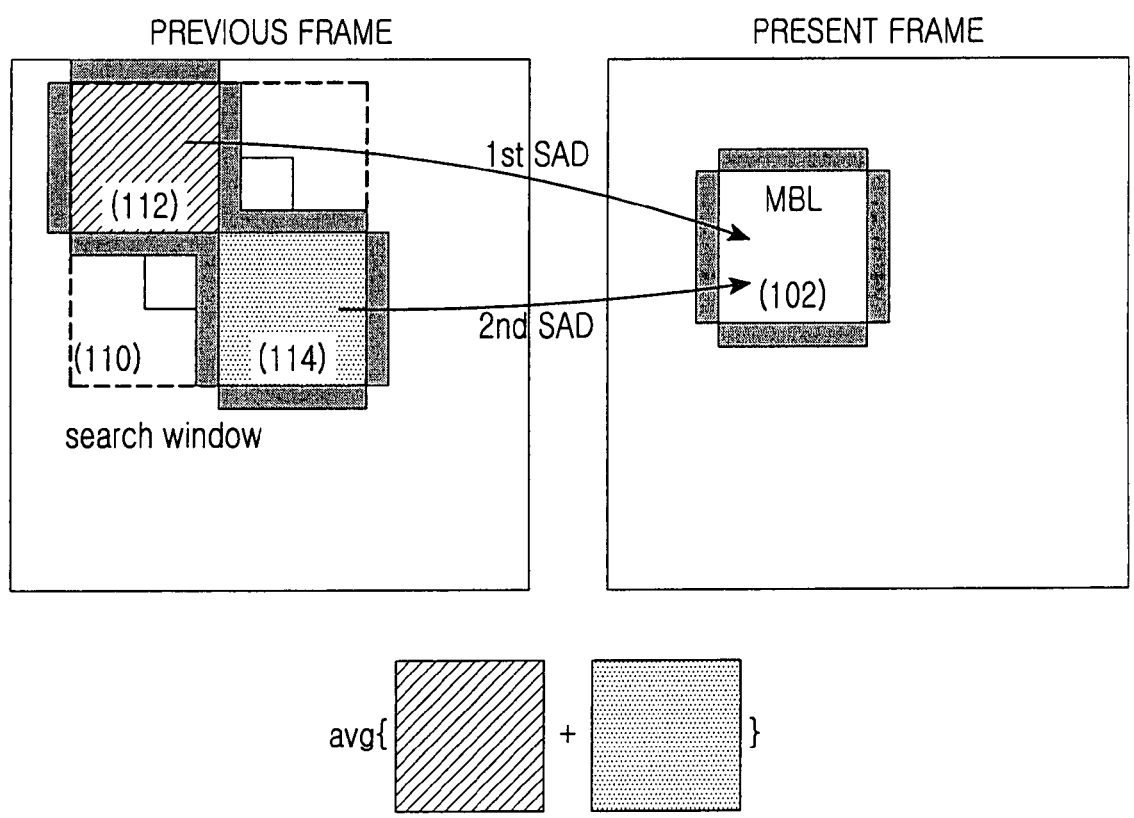
FIG. 3 is a conceptual overview of an error concealment technique in decoding of a moving picture in accordance with an exemplary embodiment of the present invention.

FIG. 3 is a conceptual view of an error concealment technique in the decoding of a moving picture according to an exemplary embodiment of the present invention.

Referring to FIG. 3, in order to conceal an erroneous macro block 102 in a present frame when a moving picture is decoded, a search window 110 is appropriately established in a previous frame (reference frame) in a similar manner to the technique shown in FIG. 1, which contains the erroneous macro block 102, and respective macro blocks are searched in the corresponding search window 110. According to the present invention, a macro block 112 having adjacent pixels with the smallest differences from (that is, the highest similarities) to those of the erroneous macro block 102 is found (the first block), and a macro block 114 having the second highest similarity to the erroneous macro block 102 is also found (the second block). At this time, the similarity is ascertained by using a scheme in which an Sum of Absolute Differences (SAD) is ascertained.

To reiterate, the process of finding the second macro block 114 having the second highest similarity to erroneous macro block 102 does not mean performing an additional calculation process, but can be achieved by confirming the macro block 114 having the second highest similarity based on similarities accorded to macro blocks that were previously calculated in the course of finding the first macro block 112 having the highest similarity to erroneous macro block 102. Subsequently, the erroneous macro block 102 is concealed using an average between the macro block 112 having the highest similarity and the macro block 114 having the second highest similarity.

In this way, in this particular embodiment of the present invention, an erroneous block can be concealed using an average between the most suitable block (first macro block) and the second most suitable block (second macro block) from a previous frame.

Additionally, according to the present invention, it is also contemplated to achieve error concealment by using additional macro blocks from the initial calculations, such as a third macro block having the third highest similarity, a fourth macro block having the fourth highest similarity, and so forth.

Moreover, when an average for the respective used blocks is calculated, a simple average may be calculated, or a weighted average on which appropriate weights are reflected according to degrees of suitability may be calculated.

Figure 4:
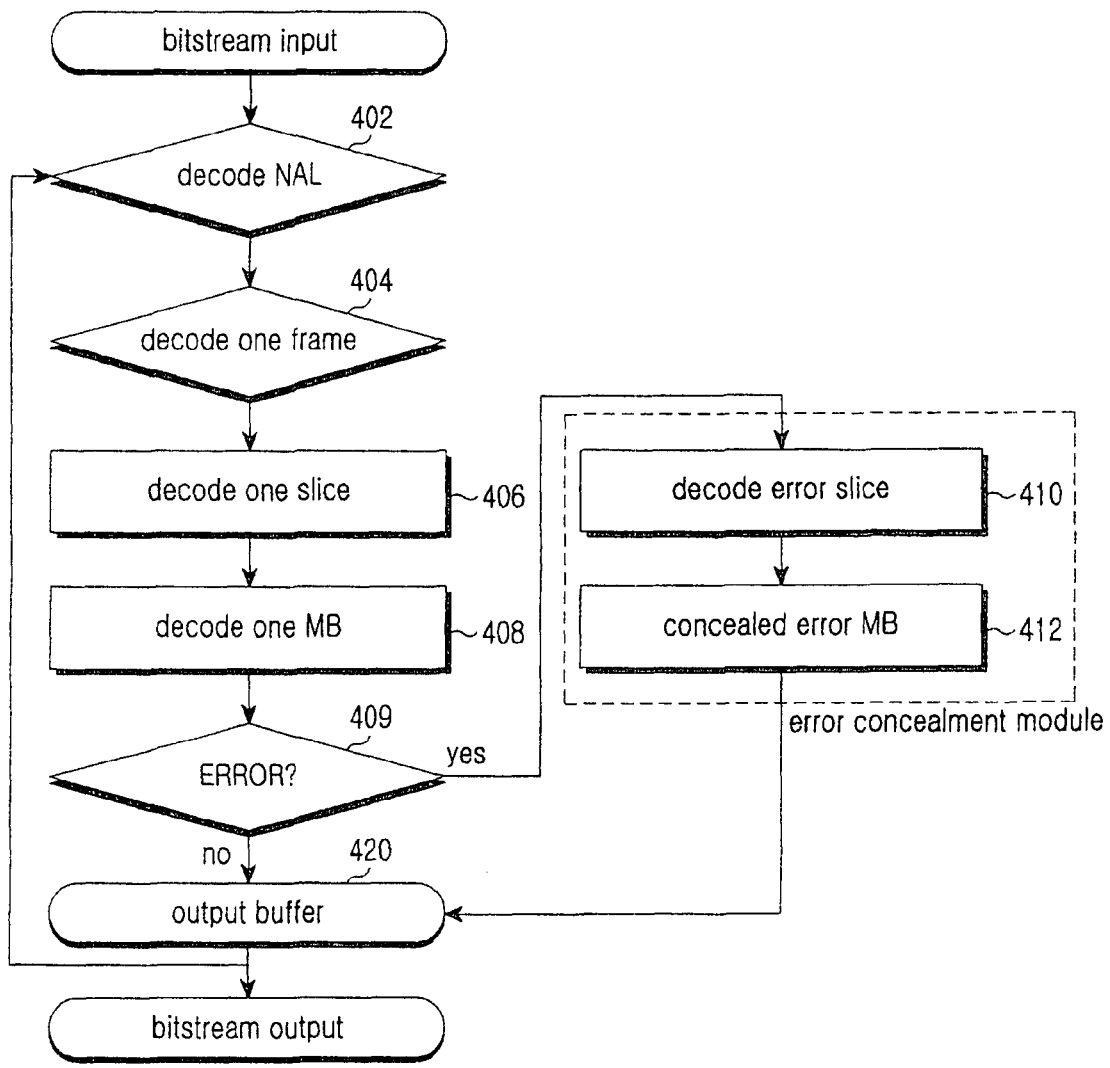
FIG. 4 is a flowchart of a method for error concealment in the decoding of a moving picture in accordance with an exemplary embodiment of the present invention.

FIG. 4 is a flowchart of an error concealment method of decoding of a moving picture according to an exemplary embodiment of the present invention. This error concealment method can be performed in the image decoding apparatus as illustrated in FIG. 2. Referring to FIG. 4, if a bit stream is input, the bit stream of an NAL (Network Abstraction Layer) is decoded in step 402, each frame is decoded in step 404, and each slice of each frame is decoded in step 406. Next, macro blocks of each slice are decoded in step 408. At decision step 409, it is determined whether the one macro block decoded at step 408 has any errors, a macro block having a highest similarity to the erroneous macro block in a previous frame. When there are no erroneous macro blocks, the procedure goes to step 420, wherein the corresponding decoded macro blocks are separately stored in an output buffer and then are output as a recovered bit stream.

However, when at step 409, it is determined that an erroneous macro block (or an erroneous slice) occurs after at least one macro block has been decoded in step 408, the corresponding erroneous slice is decoded in step 410, and an error concealment operation of the erroneous macro block is performed in step 412. In step 412, the error concealment operation can be performed according to the aforementioned of the present invention, as described in the discussion of FIG. 3. In this way, the error concealment technique according to the present invention has an advantage over previously known error techniques in that error concealment is enabled by using the output signals of a decoding apparatus without undergoing a significant change in the design of the decoding apparatus.

Furthermore, since the present invention uses the previously calculated values that were used for finding the first (i.e. most suitable) block for in order to find the second block, third block, nth block, etc., the invention represents an improvement over previous DMVE techniques because there is more accurate concealment without an increased or additional amounts of calculations in comparison the conventional DMVE technique, and can obtain higher efficiency in error recovery than known heretofore.

In order to confirm the advantageous performance of the inventive error concealment technique according to the present invention, tests were conducted that implemented the existing DMVE technique and the multi-hypothesis technique according to the present invention, respectively, with the results obtained from the tests being shown below in Table 1.

TABLE 1

| SEQUENCES | DMVE | MULTI-HYPOTHESIS | INCREASE/DECREASE |
| --- | --- | --- | --- |
| Foreman | 28.19 | 28.42 | +0.23 |
| Football | 23.86 | 24.30 | +0.44 |
| Stefan | 22.55 | 23.32 | +0.77 |

TABLE 1-continued

| SEQUENCES | DMVE | MULTI-HYPOTHESIS | INCREASE/DECREASE |
|---|---|---|---|
| Bus | 22.46 | 23.36 | +0.90 |
| Ice | 26.03 | 26.46 | +0.43 |
| Hall monitor | 31.93 | 28.74 | −3.19 |
| City | 29.45 | 30.09 | +0.64 |
| Crew | 27.79 | 28.32 | +0.53 |

Referring to Table 1, eight arbitrary test sequence images were used in order to ensure the reliability of the tests. The used images were four images called "Foreman", "Bus", "Football" and "Stefan", respectively, which are characteristic of rapid motion, and four images called "Ice", "Hall monitor", "City" and "Crew", respectively, which are characteristic of slow motion.

A total of 10 tests were conducted for the respective images by generating other types of error patterns. As presented in Table 1, results of the tests show that although there are variations according to images, the multi-hypothesis technique proposed in the present invention may obtain a PSNR (Peak Signal to Noise Ratio) characteristic higher by about 0.5 dB than that of the existing DMVE technique. The tests were conducted under the condition of an error rate of 10%, which pays due regard to an error rate that may actually occur in the transmission of a moving picture.

As described above, according to the inventive method and apparatus for error concealment in the decoding of a moving picture, higher recovery efficiency can be obtained than known heretofore with a comparatively small amount of calculations, so that it is possible to efficiently achieve increased error concealment without increased circuit complexity or significantly increased costs.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for error concealment in the decoding of a moving picture, the method comprising the steps of:
   (a) determining an erroneous macro block in a present frame during the decoding of a moving picture;
   (b) comparing adjacent pixels of respective macro blocks in a previous frame with adjacent pixels of the erroneous macro block in the present frame when the erroneous macro block has been determined in step (a);
   (c) finding a first macro block having a highest similarity to the erroneous macro block and at least a second macro block having at least a second highest similarity to the erroneous macro block in the previous frame by;
   (d) obtaining an average between the first and second macro blocks found in step (c); and
   (e) replacing the erroneous macro block determined in step (a) with a macro block having pixel values based on the average obtained in step (d) to conceal the erroneous macro block.

2. The method as recited in claim 1, wherein step (c) is performed within a search window that is positioned corresponding to the erroneous macro block in the previous frame and is established in a predetermined range.

3. The method as recited in claim 2, wherein, when the adjacent pixels of the respective blocks in the previous frame are compared with the adjacent pixels of the erroneous block in the present frame, the pixels are compared by ascertaining a Sum of Absolute Differences (SAD) value.

4. The method as recited in claim 2, wherein the average between the first and second macro blocks having the highest and next highest similarities comprises the substep of calculating a simple average or a weighted average on which weights according to similarities are reflected.

5. The method as recited in claim 1, wherein, when the adjacent pixels of the respective blocks in the previous frame are compared with the adjacent pixels of the erroneous block in the present frame, the pixels are compared by ascertaining a Sum of Absolute Differences (SAD) value.

6. The method according to claim 5, wherein steps (b) and (c) are performed by a Decoder Motion Vector Estimation (DMVE) technique.

7. The method as recited in claim 1, wherein the average between the first and second macro blocks having the highest and next highest similarities comprises the substep of calculating a simple average or a weighted average on which weights according to similarities are reflected.

8. The method according to claim 1, wherein steps (b) and (c) are performed by a Decoder Motion Vector Estimation (DMVE) technique.

9. The method according to claim 1, wherein step (c) includes finding a third macro block having a second highest similarity relative to the second macro block.

10. A moving picture decoding apparatus for conducting an error concealment function, the moving picture decoding apparatus comprising:
   a parser for parsing an input bit stream into units of slices;
   an entropy decoder for entropy-decoding the slices output from the parser into units of macro blocks, and for outputting information associated with an erroneous macro block;
   an inverse quantizer unit for inversely quantizing a discrete cosine transform (DCT) coefficient, which has been quantized during coding, said inverse quantizer receiving said information associated with the erroneous macro block output from the entropy decoder, and thereby recovering the DCT coefficient;
   an inverse converter unit for receiving discrete cosine transformed data from the inverse quantizer unit and converting said discrete cosine transformed data into original data;
   a motion compensator unit for outputting motion compensation information by making reference to an image of a previous reference frame;
   an adder unit for adding the original data output from the inverse converter unit with said motion compensation information output from the motion compensator unit; and
   an error concealment unit for concealing the erroneous macro block, said error concealment unit for receiving said information associated with the erroneous macro block from the entropy decoder and the original data output from the inverse converter unit with said motion compensation information output from the motion compensator unit output from the adder unit, and for outputting a final recovered frame,
   wherein the error concealment unit finds a first macro block from the previous frame having a highest similarity to the erroneous macro block from initial calculations of the previous frame, and a second block having a next highest similarity to the erroneous macro block from initial calculations of the previous frame, and replacing the erroneous macro block by using an average between the first and second found macro blocks, thereby concealing the erroneous macro block.

11. The moving picture decoding apparatus according to claim 10, wherein the error concealment unit includes means for comparing adjacent pixels of respective macro blocks in the previous reference frame with adjacent pixels of the erroneous macro block in a present frame.

12. The moving picture decoding apparatus according to claim 11, wherein the means for comparing adjacent pixels in the concealment unit includes ascertaining a Sum of Absolute Differences (SAD) value of the adjacent pixels of the respective macro blocks in the previous frame are compared with a SAD value of the adjacent pixels of the erroneous macro block in the present frame.

13. The moving picture decoding apparatus according to claim 11, wherein the average between the first and second macro blocks having the highest and next highest similarities comprises the substep of calculating a simple average or a weighted average on which weights according to similarities are reflected.

14. The moving picture decoding apparatus according to claim 11, wherein the means for comparing adjacent pixels in the error concealment unit is performed by a Decoder Motion Vector Estimation (DMVE) technique.

15. A moving picture decoding apparatus having error concealment capability for decoding an image of an encoded frame, said apparatus comprising:
parser uses an input bit stream into a plurality of slices;
entropy-decoding means for entropy-decoding slices output from the parser into macro block units, and for determining erroneous macro blocks;
means for inversely quantizing and converting discrete cosine transformed (DCT) data into original data;
summing means for adding the original data output from the inversely quantizing and converting DCT means with motion compensation information from a previous frame; and
error concealment means for concealing an erroneous macro block based on erroneous macro block information output from the entropy decoding means and output from the summing means wherein additional macro blocks from initial calculations are used in error concealment, including at least a first macro block having a highest similarity, a second macro block having a second highest similarity, and a third macro block having a third highest similarity.

* * * * *

UNITED STATES PATENT AND TRADEMARK OFFICE
CERTIFICATE OF CORRECTION

PATENT NO. : 8,199,817 B2  
APPLICATION NO. : 11/901589  
DATED : June 12, 2012  
INVENTOR(S) : Yong-Deok Kim et al.

Page 1 of 1

It is certified that error appears in the above-identified patent and that said Letters Patent is hereby corrected as shown below:

Title Page
Item [ 73 ], Second Assignee, should read as follows:

--Korea University Industrial & Academic Collaboration Foundation
1, Anam-Dong 5-Ga, Seongbuk-Gu, Seoul, Republic of Korea--

Signed and Sealed this
Twenty-second Day of January, 2013

David J. Kappos
*Director of the United States Patent and Trademark Office*